United States Patent

[11] 3,624,234

| [72] | Inventor | Rudolph Edward Steck<br>Stratford, Conn. |
|---|---|---|
| [21] | Appl. No. | 821,076 |
| [22] | Filed | May 1, 1969 |
| [45] | Patented | Nov. 30, 1971 |
| [73] | Assignee | Raybestos-Manhattan, Inc.<br>Passaic, N.J. |

[54] FRICTION MATERIAL
4 Claims, No Drawings

[52] U.S. Cl. .................................................... 117/126 AF,
117/169 A, 106/36
[51] Int. Cl. .................................................... B32b 19/08,
C09k 3/14
[50] Field of Search ........................................... 117/126
AF, 169 A, 169; 106/36; 252/313 S

[56] References Cited
UNITED STATES PATENTS

| 2,597,872 | 5/1952 | Iler .............................. | 117/169 X |
| 2,787,965 | 4/1957 | Luvisi .......................... | 106/36 X |
| 3,009,829 | 11/1961 | Gouveia ....................... | 117/126 |
| 3,014,884 | 12/1961 | Bray ............................. | 106/36 X |
| 3,130,061 | 4/1964 | McMahon et al. ............ | 106/286 |

*Primary Examiner*—William D. Martin
*Assistant Examiner*—D. Coher
*Attorney*—Gary, Parker, Juettner, Pigott and Cullinan ABSTRACT: Essentially inorganic friction material comprising an asbestos matrix impregnated with a binder comprising principally lithium polysilicate and a minor amount of sodium methyl siliconate to enhance abrasion resistance.

FRICTION MATERIAL

This invention relates to a composition or material intended for use as a friction element in automotive and industrial brakes or clutches wherein the primary binder is principally the inorganic product derived from a sol of silica modified with lithium hydroxide known as lithium polysilicate, in combination with a minute amount of a semi-inorganic or organo siliconate additive.

Present binders which are successfully used in friction materials are either metallic or organic in nature. In the former type, the structure is derived from the compaction and sintering of mixtures of metallic and nonmetallic powders; the latter type is derived from fibrous materials and/or powders contiguously held with a binder obtained by the cure of drying coils, asphalts, synthetic resins or mixtures thereof. The sintered metallics have good wear resistance and heat resistance but have the undesirable characteristics of a low coefficient of friction in so-called wet applications, a high specific gravity causing inertia effects in rotating members, a friction drop-off length of service in wet applications due to the chemical effects of nascent metal on oil films. The organically bonded friction materials have excellent properties but only at service temperatures below the cracking temperatures of the binder which is typically around 600° F.

The present invention, employing a nonmetallic, principally inorganic composition as a binder, yields a friction material having characteristics which are new and novel. Although the binder is essentially ceramic in nature, the processing temperature or cure which is utilized to achieve its consolidation is now and an be from about 250° F. to about 350° F. but need not be in excess of 275° F. As a result, it is now possible to use an inorganic fiber such as chrysotile asbestos, in admixture with fillers such as graphite or silica, to make a matrix composition for use with lithium polysilicate sol as the principal binder to achieve a final cured structure which is resilient and semiflexible because the fiber integrity has not been weakened by a cure. This characteristic of resiliency is particularly desirable in a friction material intended for use in oil because of its effect on engagement characteristics. In fabricating a friction material for use in dry applications, as for example disc brakes, where high density is an advantage for gaining wear resistance, the composition can be adjusted to allow cold molding at the unit area pressures necessary to reduce porosity to a minimum.

Although the binder of this invention is principally an inorganic friction material modified with a minor amount of a semi-inorganic material, it is to be understood that minor percentages of organic substances may be used to gain certain advantages. In one case it may be desirable to prepare a matrix on a paper machine so that the lithium polysilicate sol can be added via saturation methods. In this case, it may be desirable to use as a sizing material an elastomeric latex such as a butadiene-styrene copolymer or a synthetic resin such as thermosetting phenol-formaldehyde to prevent swelling of the matrix during saturation. In another case it may be desirable to modify the lithium polysilicate solution with an organic material which will improve saturation or promote gel formation to minimize migration during a cure or to facilitate a bond of the lithium polysilicate sol to another siliceous constituent in the matrix, as for example, chrysotile or anthophyllite asbestos.

Typical gel promoters which may be added to the lithium polysilicate solution without affecting the stability of the sol are glycerine or urea. A typical saturation improver is a wetting agent such as Atlantic Refining Ultrawet K.

A semi-inorganic bonding agent found to be particularly useful in tying the lithium polysilicate sol to asbestos is sodium methyl siliconate, a water-soluble silicone compound. Other water-soluble siliconates such as extra coordinate ammonium siliconate or benzyldimethyl ammonium phenyl siliconate can also be employed. It is believed that the siliconate acts as a tie ply to enhance the lithium polysilicate bond to asbestos.

The lithium polysilicate solution is manufactured in accordance with the teachings of U.S. Iler Pat. No. 2,668,149, and comprises a lithium stabilized silica sol prepared by mixing lithium hydroxide with a silica sol of silica particles having an average diameter of 1 to 150 millimicrons to form a gel which thereafter spontaneously reverts to a sol.

According to the present invention a lithium polysilicate having an $SiO_2:Li_2O$ ratio between 4:1 and 8.5:1 has been found to be the preferred ratio resulting in best water insensitive dried gel characteristics of heat resistance and good wear, i.e. resistance to frictional use wear.

As an example of friction material made for wet applications using a matrix made on a wet machine, the following is given as typical and is not intended to be limiting in proportions or in selection of fillers or fibers. Beater or Hydrapulper furnish:

| | |
|---|---|
| Anthophyllite Asbestos | 20 |
| Chrysotile Asbestos | 20 |
| Alumina | 3 |
| Graphite | 54 |
| Sulfur | 1 |
| Butadiene-Styrene Copolymer Latex solids | 2 |

The paper was sheeted on a wet machine and stacked between felts to allow wet pressing to a uniform water content from sheet to sheet. Typical wet pressing pressure is 500 p.s.i. The paper was then dried to constant weight at 250° F.

Saturation was performed by immersion of sheets, separated by screens, into a saturant made as follows:

| | | |
|---|---|---|
| Lithium Polysilicate solution $SiO_2/Li_2O$ ratio, mol, 4.8:1 | (25.2% solids) | 100 parts by wt. |
| Sodium Methyl Siliconate (Silicone content 20%) | (31.2% solids) | 8 parts by wt. |

The saturation time will vary with thickness of the matrix but should be sufficiently long to insure complete and thorough penetration of saturant into all parts of the sheet. Saturated sheets were placed on screens, dried and cured at 275° F.

The proximate analysis of the final product was as follows:

| | |
|---|---|
| Matrix | 78.5% by weight |
| Saturant solids | 21.5% by weight |

On a transmission dynamometer which tested the material in type A oil, under automatic transmission energy conditions typical of motor car use, the dynamic coefficient of friction was 0.11 and the static coeffficient of friction was also 0.11 The wear was 0.001 inch which is typical of the wear of a typical sintered metal friction material delivering a 30 percent lower dynamic coefficient of friction.

The matrix material of the present invention in general comprises an asbestos/graphite composition modified with minor amounts of friction modifying fillers, with or without minor amounts of auxiliary sizing materials such as rubber or synthetic resins designed to prevent swelling in an aqueous media. The asbestos phase can be within the range of 20 to 50 percent by weight. The carbon phase can be within the range of 20 to 75 percent by weight. The other friction modifying fillers such as silica, alumina, barytes, litharge, zinc oxide and the like inorganics well known in the friction material art, plus the indicated minor amounts of rubbers and resins can comprise 0 to 30 percent by weight.

The binder material of the present invention comprises the following:

| | |
|---|---|
| Lithium polysilicate solids | 100 parts |
| Siliconate solids | 5 to 35 parts |

The matrix to binder solids ratio can be within the range of 65 to 87 percent by weight to 35 to 13 percent binder solids by weight.

It has been found that the use of the aforesaid siliconates has a pronounced effect on reducing wear rate. All compositions involving various matrices and lithium polysilicate, without the siliconate additive, have had poor durability. These same matrices made with 100 percent sodium methyl siliconate also wore severely. The combination of the lithium polysilicate and the siliconate seems to be a fortunate combination of materials to yield a wear resistant product.

I claim:

1. Friction material comprising a fibrous asbestos matrix impregnated with lithium polysilicate as the principal binder thereof together with a minor amount of sodium methyl siliconate.

2. The friction material of claim 1 wherein the matrix additionally contains graphite.

3. The friction material of claim 1 wherein the lithium polysilicate is a lithium stabilized silica sol having a $SiO_2:Li_2O$ ratio of between 4:1 and 8.5:1.

4. Friction material comprising an asbestos and graphite matrix wherein the asbestos comprises from about 20 to about 50 percent by weight and the graphite from about 20 to about 75 percent by weight, impregnated with a binder composition comprising 100 parts by weight of lithium polysilicate solids and from about five to about 35 parts by weight of sodium methyl silicate solids, the matrix to binder solids ratio being within the range of from about 65 percent to about 87 percent matrix to from about 35 percent to about 13 percent binder solids by weight.

* * * * *